(12) United States Patent
Fluture

(10) Patent No.: US 11,880,497 B2
(45) Date of Patent: Jan. 23, 2024

(54) OMNIDIRECTIONAL MOBILITY SYSTEM

(71) Applicant: Cristian Darius Fluture, Bellevue, WA (US)

(72) Inventor: Cristian Darius Fluture, Bellevue, WA (US)

( * ) Notice: Subject to any disclaimer, the term of this patent is extended or adjusted under 35 U.S.C. 154(b) by 839 days.

(21) Appl. No.: 16/965,930

(22) PCT Filed: Feb. 6, 2019

(86) PCT No.: PCT/US2019/016874
§ 371 (c)(1),
(2) Date: Jul. 29, 2020

(87) PCT Pub. No.: WO2019/157071
PCT Pub. Date: Aug. 15, 2019

(65) Prior Publication Data
US 2021/0055785 A1   Feb. 25, 2021

Related U.S. Application Data

(60) Provisional application No. 62/627,586, filed on Feb. 7, 2018.

(51) Int. Cl.
*G06F 3/01* (2006.01)
*A63F 13/218* (2014.01)
(Continued)

(52) U.S. Cl.
CPC ............ *G06F 3/011* (2013.01); *A63F 13/218* (2014.09); *G06F 3/0304* (2013.01);
(Continued)

(58) Field of Classification Search
None
See application file for complete search history.

(56) References Cited

U.S. PATENT DOCUMENTS 5,902,214 A * 5/1999 Makikawa ............. G16H 20/30
                                                    482/52
6,102,832 A * 8/2000 Tani ........................ H04N 7/18
                                                348/E13.058

(Continued)

OTHER PUBLICATIONS

International Search Report and Written Opinion, International Application No. PCT/US2019/016874, dated May 21, 2019, 13 pages.

*Primary Examiner* — Dorothy Harris
(74) *Attorney, Agent, or Firm* — Seed IP Law Group LLP

(57) ABSTRACT

Systems and methods for providing stationary omnidirectional locomotion for virtual reality or other applications. An omnidirectional mobility system ("OMS") is provided that allows a user thereof to walk or run in all directions as the OMS constrains the user's movement relative to an environment to within a small area. The OMS includes two independent mobile OMS devices that each support one of the user's feet. Each OMS device tracks one of the user's feet during movement and moves responsive to the tracking to remain under the user's feet, thereby providing stationary locomotion. Each of the two OMS devices may include a plurality of tracking sensors, and a plurality of wheels to provide omnidirectional movement. Non-limiting examples of drives/wheels that may be used include Mecanum based systems, omni based systems, swerve drives, etc.

31 Claims, 10 Drawing Sheets

(51) Int. Cl.
  *G06F 3/03* (2006.01)
  *G06F 3/033* (2013.01)
  *G06F 3/0346* (2013.01)
  *G06T 7/73* (2017.01)
  *H04N 5/33* (2023.01)

(52) U.S. Cl.
  CPC .......... *G06F 3/0334* (2013.01); *G06F 3/0346* (2013.01); *G06T 7/73* (2017.01); *G06F 2203/012* (2013.01); *G06T 2207/10048* (2013.01); *G06T 2207/30196* (2013.01); *G06T 2207/30204* (2013.01); *H04N 5/33* (2013.01)

(56) References Cited

U.S. PATENT DOCUMENTS

| | | | |
|---|---|---|---|
| 6,774,885 B1* | 8/2004 | Even-Zohar | A61B 5/4023 434/247 |
| 8,758,207 B2* | 6/2014 | Elbaz | A63B 23/04 482/79 |
| 2004/0242390 A1* | 12/2004 | Willliams | A63B 23/0464 482/146 |
| 2009/0058855 A1* | 3/2009 | Mishra | G06F 3/011 345/427 |
| 2010/0030378 A1 | 2/2010 | Choi et al. | |
| 2013/0000438 A1 | 1/2013 | Ouellet | |
| 2015/0209665 A1* | 7/2015 | Priestnall | A63F 13/211 463/36 |
| 2016/0328028 A1 | 11/2016 | Khojasteh et al. | |
| 2017/0252642 A1 | 9/2017 | Matina | |
| 2021/0346755 A1* | 11/2021 | Epstein | F16C 23/06 |

* cited by examiner

OMNIDIRECTIONAL MOBILITY SYSTEM

BACKGROUND

Technical Field

The present disclosure generally relates to systems and methods that provide stationary locomotion, for example, stationary locomotion for use in virtual reality, fitness, healthcare, or other applications.

Description of the Related Art

Virtual reality (VR) is a computer-generated environment that simulates a realistic experience. The environment may be similar to the real world to create a lifelike experience grounded in reality or fiction. Augmented reality systems may also be considered a form of VR that layer virtual information over a live camera feed or view into a headset, smartphone or tablet device, for example. Current VR technology commonly uses virtual reality headsets, sometimes in combination with physical environments or props, to generate realistic images, sounds and other sensations that simulate a user's physical presence in a virtual environment. A person using virtual reality equipment may be able to visually explore the artificial world, move around in it, and interact with virtual features or items. The effect is commonly created by VR headsets that include a head-mounted display with a small screen in front of the eyes, but can also be created through specially designed rooms with one or multiple large screens.

Locomotion in virtual reality presents many problems and challenges. In addition to conventional input devices like a mouse, keyboard, gamepad, controller, etc., the most obvious method of locomotion is simply walking around within the range of the positional tracking devices. One problem presented by conventional walking is the available space of the room in which the user's is operating the VR system. Physical obstacles such as walls and objects will prevent the user from advancing. One solution to this problem is an omnidirectional treadmill, which is a mechanical device, similar to a typical treadmill, that allows a person to perform locomotive motion in any direction, allowing for 360 degrees of movement. However, such devices may be prohibitively large, costly, and may not provide a user experience that accurately simulates locomotion in the real world.

Besides VR gaming applications, omnidirectional locomotion may be advantageous in numerous other applications, such as training and simulation, fitness, healthcare, architecture, virtual tourism, meetups and events, or any other application where movement (e.g., walking, running) is desired but available suitable space may be limited (e.g., due to weather, traffic, hazards, etc.).

BRIEF SUMMARY

An omnidirectional mobility system that provides stationary omnidirectional motion for a user may be summarized as including first and second omnidirectional mobility system (OMS) devices, each of the OMS devices including a body that includes a top surface that supports a foot of the user; a movement subsystem coupled to the body, the movement subsystem operative to cause the OMS device to move on a surface that supports the OMS device; a sensor subsystem coupled to the body, the sensor subsystem operative to sense at least a position of the foot of the user during use; at least one nontransitory processor-readable storage medium that stores at least one of instructions or data; and at least one processor operatively coupled to the at least one nontransitory processor-readable storage medium, the movement subsystem, and the sensor subsystem, in operation, the at least one processor receives sensor data from the sensor subsystem; and controls the movement subsystem to position the OMS device under the foot of the user while constraining the user's overall movement to a confined area to provide substantially stationary locomotion.

The movement subsystem may include four wheels; and four motors, each of the motors operative to drive a respective one of the wheels. Each of the wheels may include a Mecanum wheel. Each of the Mecanum wheels may include plurality of rollers oriented at an angle of at least 60 degrees relative to a forward direction to optimize forward and backward movement relative to sideways movement of the OMS device. Each of the wheels may include an omni wheel. Each of the motors may include a hub motor. Each of the motors may include one of a brushless motor, a slotless brushless motor, a direct current (DC) motor, or a stepper motor. The movement subsystem may include a plurality of swerve drives. The movement subsystem may include a plurality of motors and a corresponding plurality of encoders, each of the encoders being operative to determine the position of a respective one of the motors, and to provide position data to the at least one processor. The sensor subsystem may include an optical sensor directed upward from the top surface of the body. The optical sensor may include a camera. The optical subsystem may include an infrared (IR) camera and at least one IR light emitting diode. The top surface may include a window therein, and the optical subsystem is positioned in the body below the window. The sensor subsystem may be operative to track both the position and the orientation of the foot of the user during use. The sensor subsystem may detect at least one marker coupled to the user's foot or footwear. The sensor subsystem may include a pressure sensor positioned proximate the top surface of the body, the pressure sensor operative to detect the weight distribution of the user supported by the top surface of the OMS device. The pressure sensor may include a first pressure sensor positioned relatively toward the front of the top surface and a second pressure sensor positioned relatively toward the rear of the top surface. The pressure sensor may include at least one of a resistive force sensing pad, a scale weighing sensor, or a strain gauge load cell. The sensor subsystem may be operative to track the foot of the user when the foot is in contact with the top surface and when the foot is not in contact with the top surface. The sensor subsystem may include a distance sensor operative to track the position of the OMS device relative to the other OMS device. The distance sensor may include at least one of an optical sensor or an acoustic sensor.

The omnidirectional mobility system may further include a communications interface operatively coupled to the at least one processor, the communications interface allows the at least one processor to communicate with a separate device. The communications interface may allow the at least one processor to communicate with at least one of the other OMS device, an external computing system, a gaming controller, or a peripheral device. The OMS device may emulate a directional input control of an input device. The OMS device may emulate a thumb stick of a gaming controller. The body may be formed from a polycarbonate material. The sensor subsystem may include an inertial measurement unit; and an optical sensor, wherein the at least one processor receives sensor input from the inertial measurement unit and the optical sensor, and tracks the location of the OMS device during movement in an operational environment. The optical sensor may detect a plurality of fiducial markers positioned in the operational environment. The at least one processor may receive the sensor input from the inertial measurement unit and the optical sensor, and may generate an internal map of the operational environment based at least in part on the sensor input.

An omnidirectional mobility system that may be summarized as including stationary omnidirectional motion for a user, the omnidirectional mobility system including first and second omnidirectional mobility system (OMS) devices, each of the OMS devices including a body that includes a top surface that supports a foot of the user; a movement subsystem coupled to the body, the movement subsystem operative to cause the OMS device to move on a surface that supports the OMS device, the movement subsystem including a plurality of wheels and one or more motors coupled to drive the plurality of wheels; a sensor subsystem coupled to the body, the sensor subsystem operative to sense a position of the foot of the user during use and to sense a position of the OMS device during operation thereof in an operational environment; at least one nontransitory processor-readable storage medium that stores at least one of instructions or data; and at least one processor operatively coupled to the at least one nontransitory processor-readable storage medium, the movement subsystem, and the sensor subsystem, in operation, the at least one processor receives sensor data from the sensor subsystem; and controls the at least one motor of the movement subsystem to drive the plurality of wheels to position the OMS device under the foot of the user while constraining the user's overall movement to a confined area to provide substantially stationary locomotion.

A method of operating an omnidirectional mobility system that may be summarized as including stationary omnidirectional motion for a user, the omnidirectional mobility system including first and second omnidirectional mobility system (OMS) devices, each of the OMS devices including a body that includes a top surface that supports a foot of the user, a movement subsystem coupled to the body that is operative to cause the OMS device to move on a surface that supports the OMS device, and a sensor subsystem coupled to the body that is operative to sense at least a position of the foot of the user during use, the method including receiving sensor data from the sensor subsystem of each of the OMS devices; and responsive to the received sensor data, controlling the movement subsystem of each of the OMS devices to position each of the OMS devices under one foot of the user while constraining the user's overall movement to a confined area to provide substantially stationary locomotion.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods of providing stationary omnidirectional locomotion for use in virtual reality or other applications. In at least some implementations, an omnidirectional mobility system ("OMS") is provided that allows a user thereof to walk or run in all directions as the OMS constrains the user's movement relative to an environment to within a small area (e.g., 10 square feet). Particular features of the OMSs of the present disclosure are discussed below with reference to FIGS. 1-10.

Figure 1:
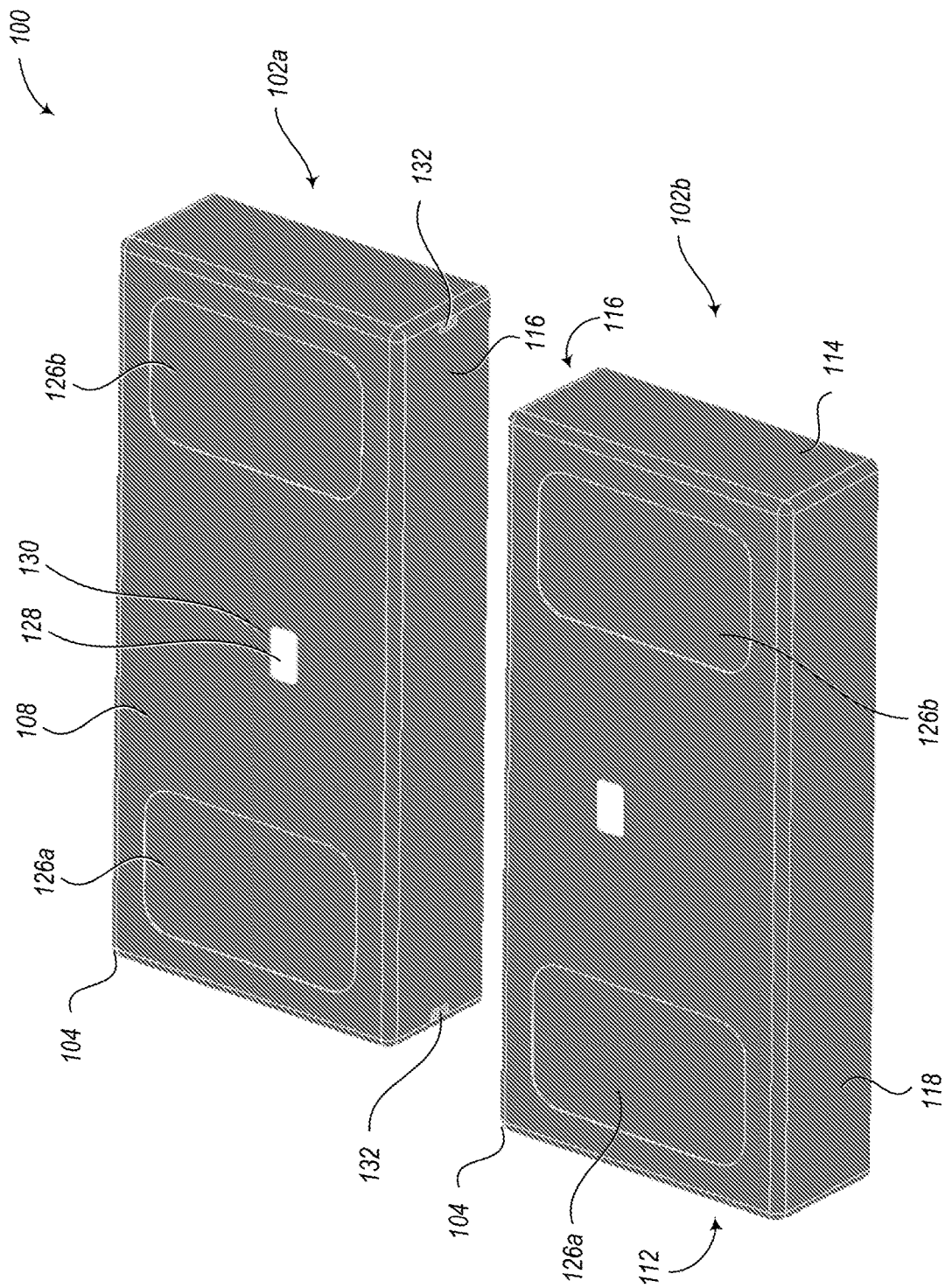
FIG. 1 is a top perspective view of an omnidirectional mobility system ("OMS") which utilizes Mecanum wheels, according to one non-limiting illustrated implementation.
Figure 2:
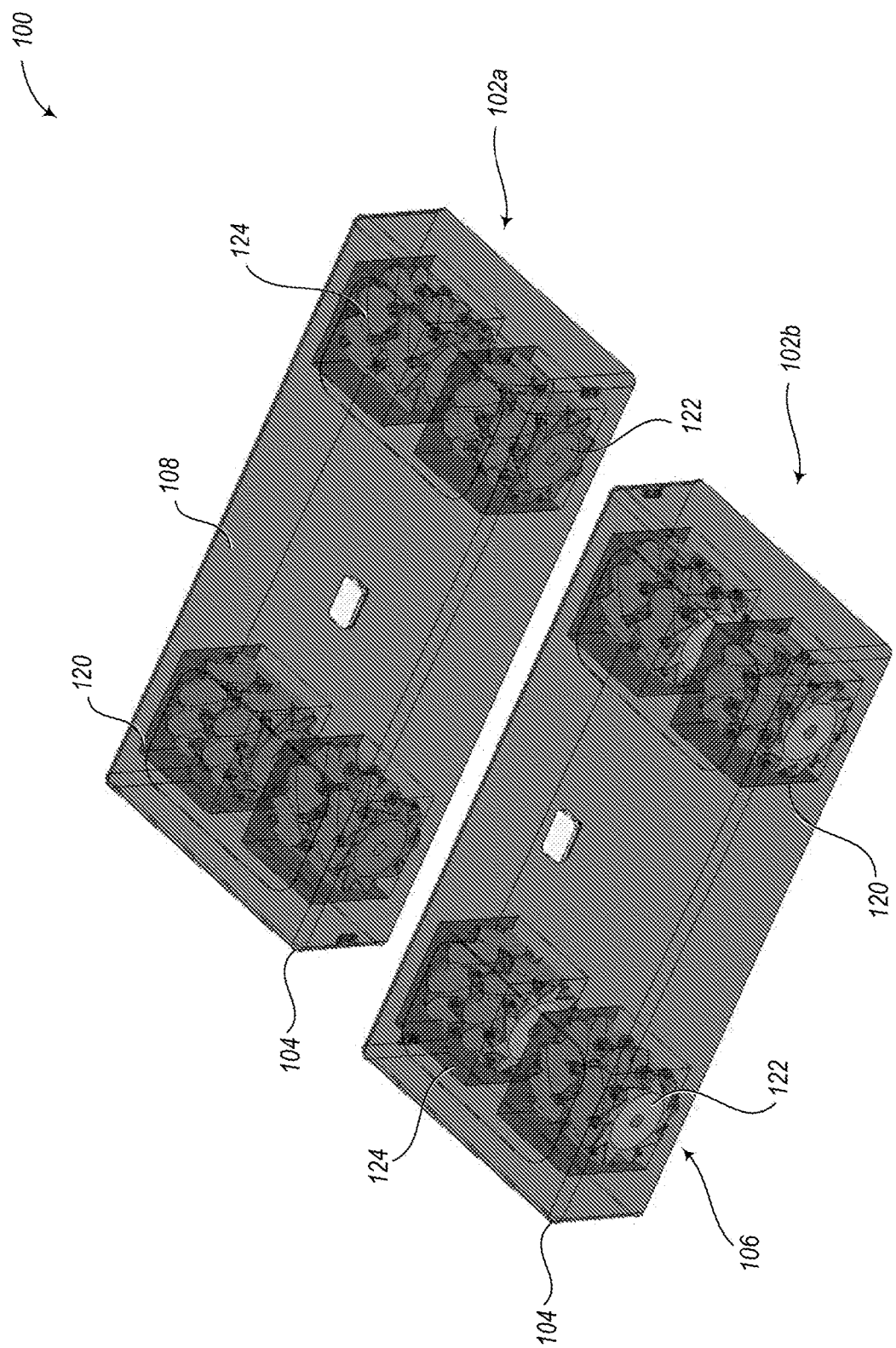
FIG. 2 is a top perspective view of the OMS of FIG. 1, with bodies of first and second OMS devices of the OMS shown as transparent to show the Mecanum wheels, according to one non-limiting illustrated implementation.
Figure 3:
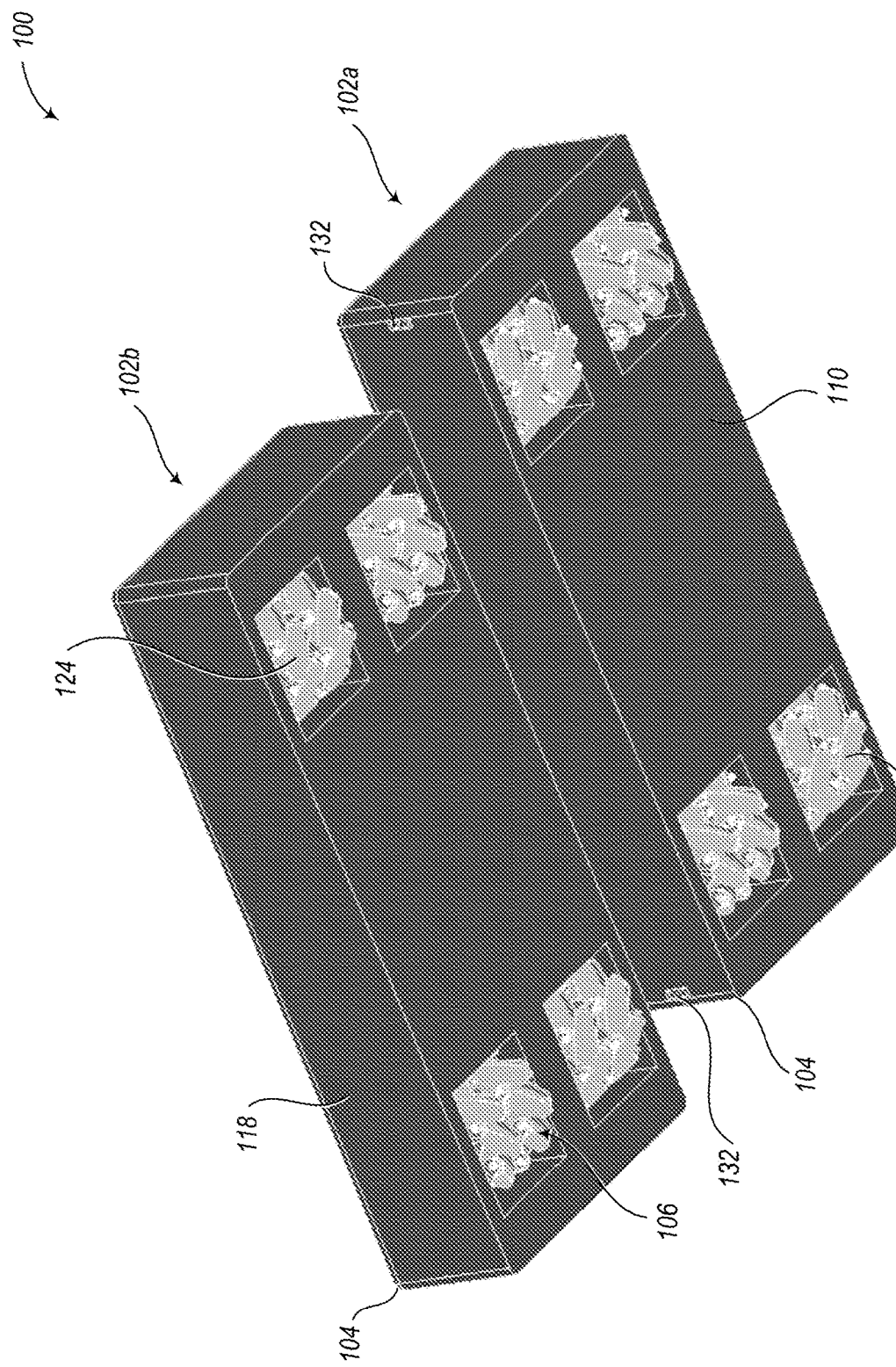
FIG. 3 is a bottom perspective view of the OMS of FIG. 1, according to one non-limiting illustrated implementation.

FIG. 1 shows a top perspective view of an omnidirectional mobility system ("OMS") 100 which utilizes Mecanum wheels to provide stationary omnidirectional locomotion for a user. The OMS 100 includes a first OMS device 102a and a separate second OMS device 102b (collectively, OMS devices 102). FIG. 2 is a top perspective view of the OMS 100, with bodies 104 of the first and second OMS devices 102 shown as transparent to show the wheels 106 of the devices. FIG. 3 is a bottom perspective view of the OMS 100, showing the Mecanum wheels 106 of each of the two OMS devices 102.

The OMS devices 102 may be similar or identical to each other in several aspects. Thus, in the Figures, components of the first OMS device 102a are labeled with the same reference numeral as the same or similar components of the second OMS device 102b. Further, discussion of the features of one of the OMS devices 102 generally applies to the features of the other of the OMS devices, unless stated otherwise.

Each of the OMS devices 102 includes a generally cuboid-shaped body or frame 104 that includes a top surface 108, a bottom surface 110 (FIG. 3) opposite the top surface, a front sidewall 112, a rear sidewall 114 opposite the front sidewall, an inner sidewall 116, and an outer sidewall 118 opposite the inner sidewall. As discussed further below, in operation, the top surface 108 of the first OMS device 102a supports and tracks a right foot of a user, and the top surface 108 of the second OMS device 102b supports and tracks a left foot of the user. Each of the OMS devices 102 is operative to track the movement of the respective foot of the user, and to move accordingly to remain directly underneath the foot as the user "walks" or otherwise moves naturally. That is, as the user lifts a foot off of the top surface 108, the OMS device 102 moves along with the foot so that the OMS device is centered below the user's foot when the foot again contacts the top surface 108 of the OMS device. Further, the OMS devices 102 are able to sense the movement of the user, and to respond accordingly to create an effect of natural walking or movement while remaining within a confined area.

In at least some implementations, the bodies 104 of the OMS devices 102 may be a polycarbonate injection molded unibody frame. The bodies 104 may also be formed of any kind of plastics of similar properties, or other types of materials. Utilizing a plastic frame may ensure that the OMS devices 102 have a small amount of flex in the structure to allow for better contact of the wheels 106 with uneven surfaces. The bodies 104 may house all internal components of the OMS devices 102. In at least some implementations, the top surface 108 may include a fabric (e.g., rubbery fabric) thereon to ensure high traction between the body 104 of each of the OMS devices 102 and one of the user's feet. The components interior to the bodies 104, discussed further below, may be partially or completely removable from the bodies.

As shown in FIG. 2, the bodies 104 of each of the OMS device include four wheel compartments 120, two compartments toward the front and two compartments toward the rear. Within each of the wheel compartments there is a wheel 106 and motor 122, which allow for the OMS device 102 to move in any direction and to rotate in place to provide the functionality discussed herein. In the illustrated implementation, the wheels 106 include Mecanum wheels. Generally, the Mecanum wheels 106 are a wheel with a series of rollers 124 attached to their circumference. In the illustrated implementation, each wheel 106 includes two adjacent series of rollers 124 attached to its circumference. These rollers 124 typically each have an axis of rotation at 45° to the plane of the wheel 106 and at 45° to a line through the center of the roller parallel to the axis of rotation of the wheel. By alternating wheels 106 with left and right-handed rollers 124 as shown, in such a way that each wheel applies force roughly at right angles to the wheelbase diagonal the wheel is on, the OMS device 102 is stable and can be made to move in any direction and turn by varying the speed and direction of rotation of each wheel. Moving all four wheels 106 in the same direction causes forward or backward movement of the OMS device 102, running the wheels on one side in the opposite direction to those on the other side causes rotation of the OMS device, and running the wheels on one diagonal in the opposite direction to those on the other diagonal causes sideways movement of the OMS device. Combinations of these wheel motions allow for motion in any direction with any rotation (including no rotation at all).

As noted above, Mecanum wheels are normally used with rollers at 45°, which achieves the same speed for forward/backward and side movements. However, due to the fact that users of the OMS 100 will mostly walk forward and backward relative to sideways movement, in at least some implementations the rollers 124 may be oriented at 60° (or more) to optimize forward/backward movement relative to sideways movement. In such cases, the sideways speed of the OMS devices 102 will be lower, but such may be acceptable as users tend to walk sideways slower than they walk forward or backward.

In the illustrated implementation, the motor 122 includes a hub motor which advantageously saves space and reduces mechanical complexity. As shown in FIG. 2, each of the hub motors 122 is positioned inside of a wheel 106. The outer case of the motor 122 is directly attached to the inside of the wheel 106. These types of motors 122 may also be referred to as "outrunners," as the outer case spins and the shaft is static.

In at least some implementations, the motors 122 may be brushless motors which advantageously provide high reliability and torque and have a long lifetime. In particular, in at least some implementations, a slotless brushless motor may be used, which has zero cogging torque. The absence of cogging torque allows for very smooth operation. Because of this, the control current used to drive the motor 122 may be used to estimate the force that the user counters with. As discussed further below, each of the motors 122 may also include an encoder which allows the system to read the current position of each of the motors. This may be needed to achieve high torque when the user is in a standing position. Alternative types of motors 122 that may be used include brushless slotted motors, DC motors, stepper motors, etc.

The OMS devices 102 also include a number of sensors that facilitate the operation of the OMS 100. In particular, each of the OMS devices includes a front pressure pad 126a and a rear pressure pad 126b (collectively, pressure sensors or pads 126) positioned on the top surface 108 that are together used to estimate the user's weight distribution. This feature provides a safe and natural experience for the user, and also provides tracking information about the user's movement. For example, the system may be programmed to not allow the OMS devices 102 to separate from each other sideways when the user's weight is distributed evenly, which otherwise could cause the user's legs to be spread sideways by a distance that is uncomfortable. In at least some implementations, the pressure pads 126 may comprise resistive force sensing pads. In other implementations, the pressure pads 126 may comprise scale weighing sensors, strain gauge load cells, or other types of sensors operative to sense pressure.

Figure 8:
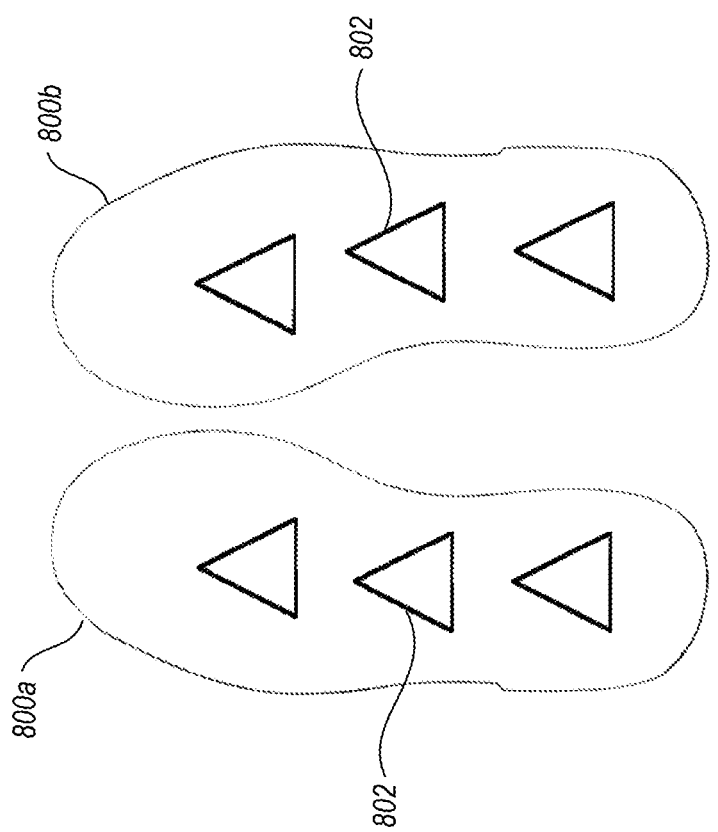
FIG. 8 is a bottom view of a pair of shoe soles of a user of an OMS of the present disclosure, showing a plurality of markers or stickers placed thereon that may be detected by optical sensors of OMS devices to track the user's feet during use of the OMS, according to one non-limiting illustrated implementation.

Each of the OMS devices 102 also includes an optical sensor 128 directed upward through a window 130 in the top surface 108. The optical sensor 128 is used to accurately locate the user's feet when the user's feet is not in contact with the OMS device 102 (e.g., when the user is taking a step). This feature allows the OMS device 102 to always position itself under the user's foot. In at least some implementations, the optical sensor 128 comprises a camera that tracks one or more markers (e.g., stickers) on a user's soles. FIG. 8 shows a bottom view of a pair of shoe soles 800a and 800b of a user that include a plurality of markers or stickers 802 placed thereon that may be detected by optical sensors (e.g., cameras) to track the user's feet during use. In some implementations, the markers 802 may include a unique asymmetric pattern that facilitates tracking. The OMS devices 102 may track both the location of the user's foot as well as rotation thereof so that the OMS devices may remain aligned with the user's feet during use. In at least some implementations, the optical sensor 128 may include a camera with an infrared (IR) filter and one or more IR emitting light emitting diodes (LEDs). In such implementations, the user may wear markers (e.g., stickers) 802 that are painted with or otherwise include an IR reflective surface that reflects the IR light emitted by the IR LED(s), which is detected by the camera to track the position and rotation of each of the user's feet. Such implementation may reduce the noise and make tracking easier. In at least some implementations, the optical sensor 128 may utilize "markerless" tracking, in which the OMS device 102 tracks the user's feet by sensing the natural features (e.g., shoe soles, shape of feet) without use of special markers.

The inner wall 116 of each of the OMS devices 102 may also include one or more distance sensors 132 that may be used to track the position of the OMS devices relative to each other (e.g., to avoid collision). In the illustrated implementation, each of the OMS devices 102 includes two distance sensors 132, one distance sensor positioned at a front corner of the inner wall and one distance sensor positioned at a rear corner of the inner wall. The distance sensors 132 may be optical sensors, acoustic sensors (e.g., ultrasonic sensors), or any other type of distance sensors operative to track the position of the OMS devices relative to each other.

Figure 4:
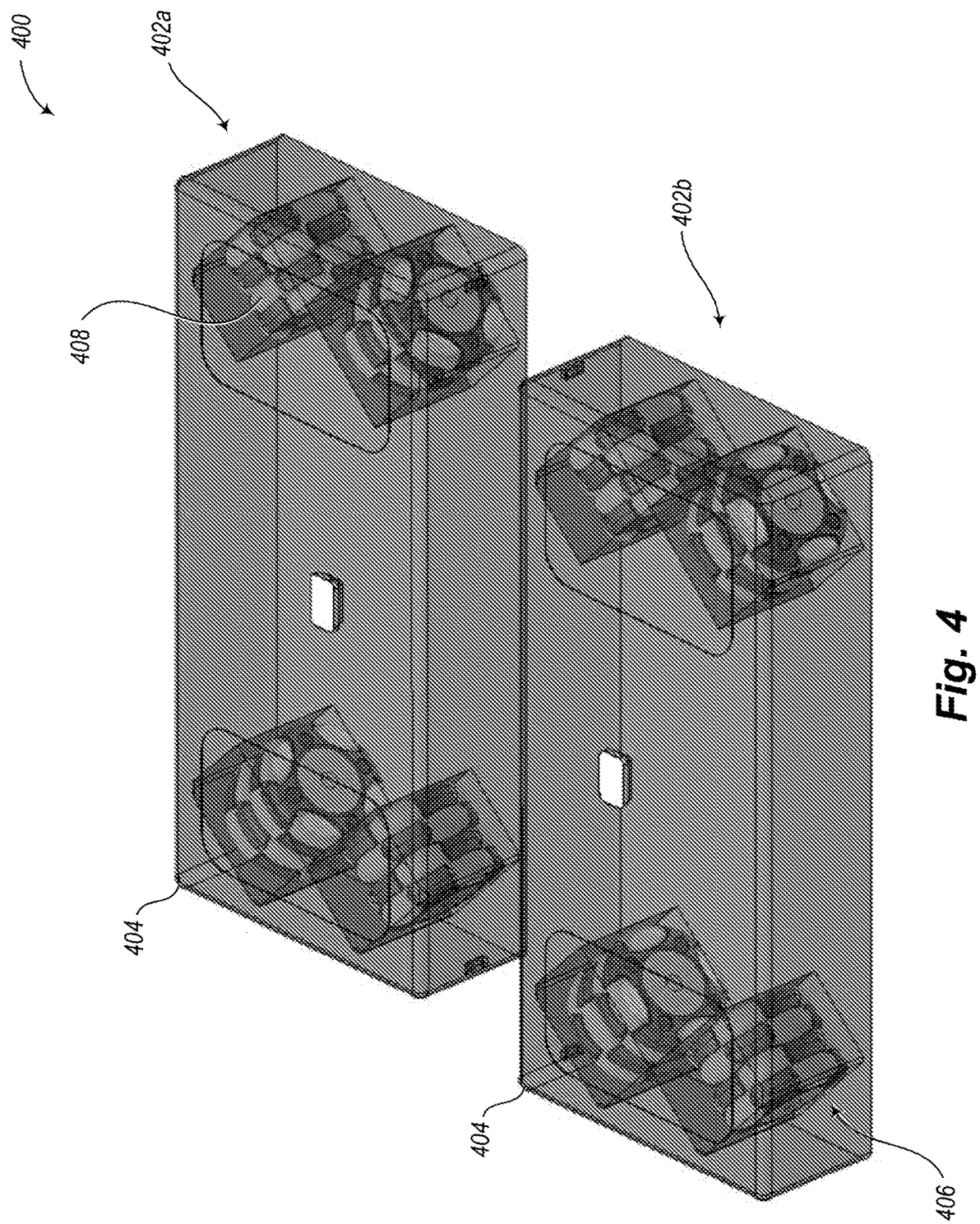
FIG. 4 is a top perspective view of an OMS which utilizes omni wheels, with bodies of first and second OMS devices of the OMS shown as transparent to show the omni wheels, according to one non-limiting illustrated implementation.

FIG. 4 is a top perspective view of an OMS 400, with bodies 404 of first and second OMS devices 402a and 402b of the OMS 400 shown as transparent to show wheels 406 of the OMS devices. The OMS 400 may be similar or identical to the OMS 100 discussed above in many respects. Thus, the discussion above regarding the OMS 100 generally applies to the OMS 400, and is not repeated herein for the sake of brevity. In this implementation, rather than utilizing Mecanum wheels, the OMS devices 402 include omni wheels or "poly wheels" 406. The omni wheels include small discs 408 around their circumference which are perpendicular to the turning direction. The effect is that each of the wheels 106 can be driven with full force, but will also slide laterally with ease, thus allowing for omnidirectional movement, similar to the Mecanum wheels discussed above.

Omni wheels 406 are normally oriented at 45°, which achieves the same speed for forward/backward and side movements. As discussed above, due to the fact that users of the OMS 400 will mostly walk forward and backward relative to sideways movement, in at least some implementations the omni wheels may be oriented at 60° (or more) to optimize forward/backward movement relative to sideways movement.

Figure 5:
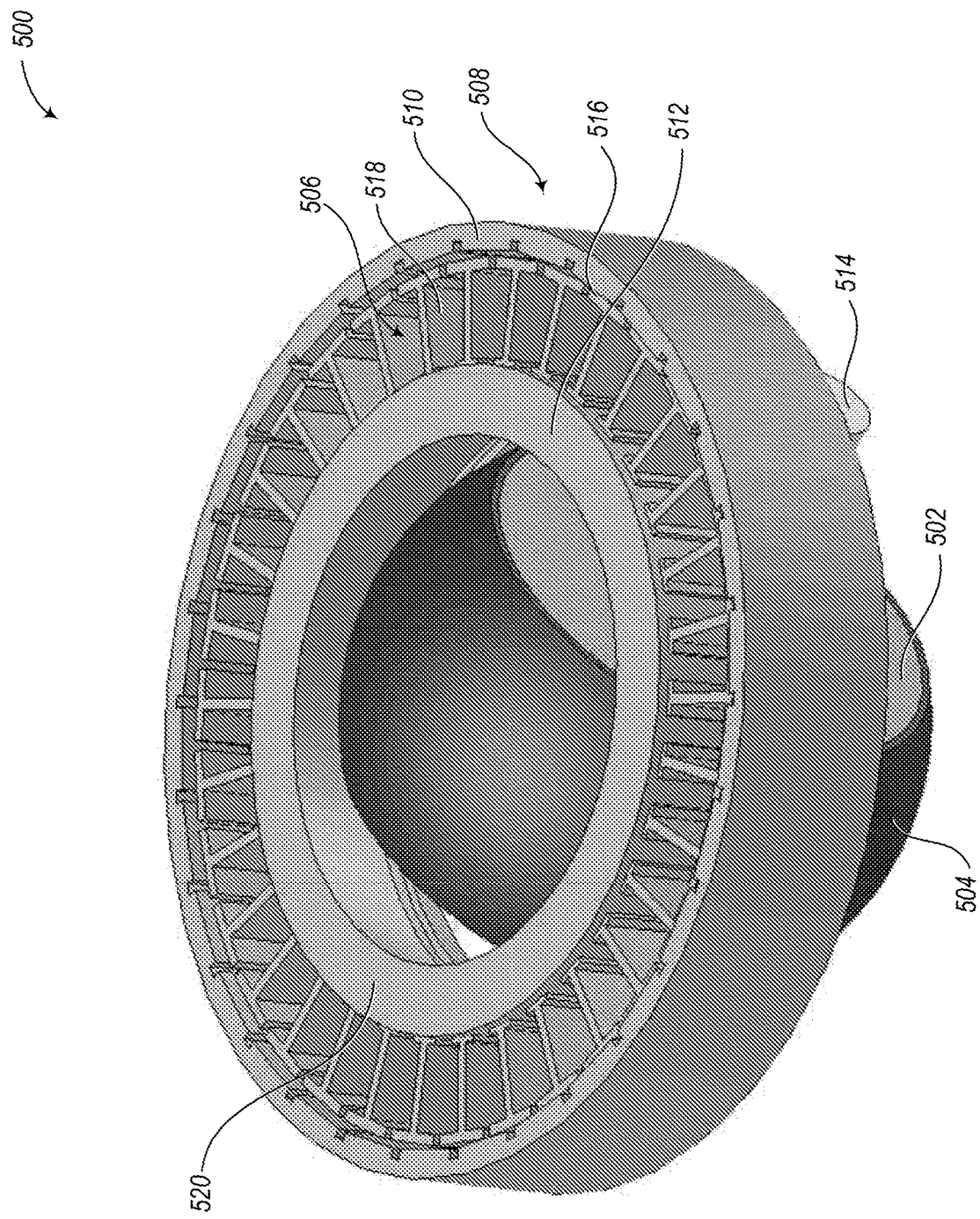
FIG. 5 is a top perspective view of a swerve drive which may be used in one or more of the OMSs of the present disclosure, according to one non-limiting illustrated implementation.
Figure 6:
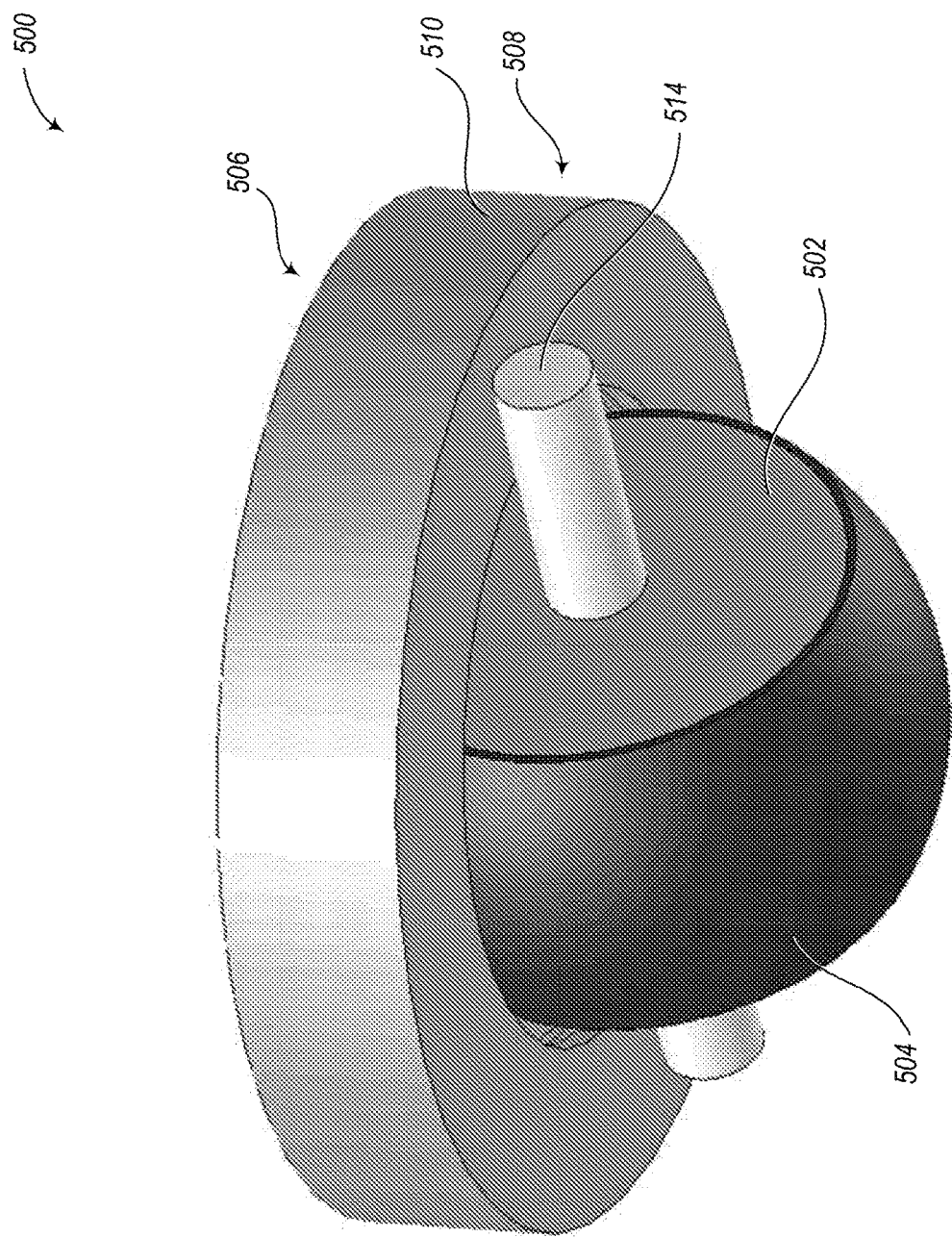
FIG. 6 is a bottom perspective view of the swerve drive of FIG. 5, according to one non-limiting illustrated implementation.
Figure 7:
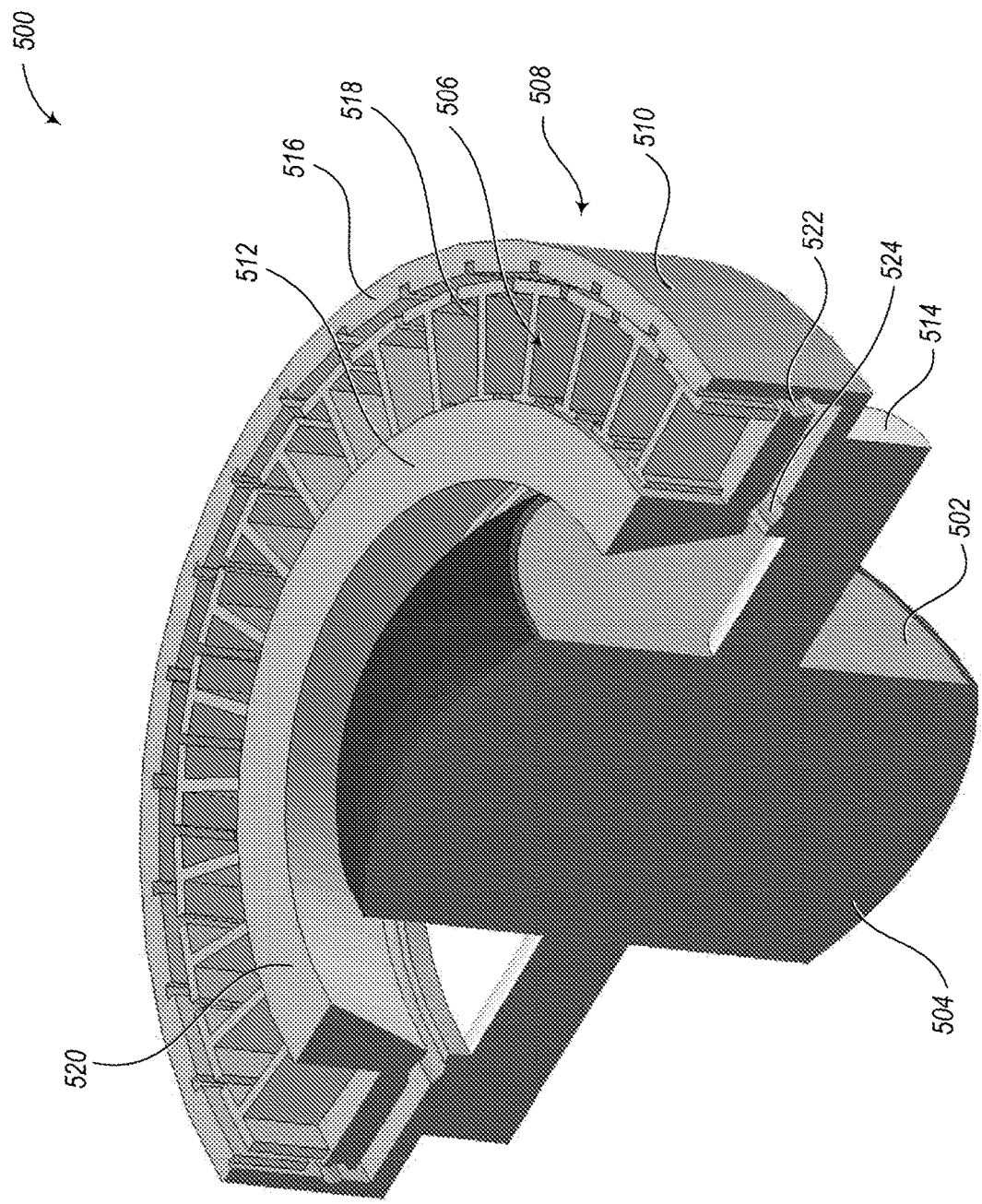
FIG. 7 is a sectional perspective view of the swerve drive of FIG. 5, according to one non-limiting illustrated implementation.

FIG. 5 is a top perspective view of a swerve drive 500, also referred to as an Ocelot drive, which may be used in one or more of the OMSs (e.g., OMS 100, OMS 400) of the present disclosure, for example, instead of Mecanum or omni wheels. FIG. 6 is a bottom perspective view of the swerve drive 500 of FIG. 5. FIG. 7 is a sectional perspective view of the swerve drive 500 of FIG. 5, showing various components thereof.

In at least some implementations, the swerve drive 500 includes a brushless hub motor 502 with an encoder (not shown) surrounded by a wheel 504 (e.g., hard rubber wheel). The swerve drive 500 further includes a swerve motor 506 positioned within a case 508 comprising an outer case 510 and an inner case 512. A shaft 514 of the motor 502 is attached to the swerve motor outer case 510. As shown in FIGS. 5 and 7, magnets 516 are attached to an inner surface of the outer case 510, and stators 518 are attached to an outer surface of the inner case 512. It is noted that the windings of the swerve motor 506 are not shown in the Figures. It is further noted that the stators 518 are shown uncovered for illustrative purposes, but in practice the stators may be covered by the case 508.

A top surface 520 of the inner case functions as a load bearing surface which receives the weight of the user during operation as the user stands on the top surface of each of the OMS devices of the OMS. As shown best in FIG. 7, a first channel 522 is provided between the outer case 510 and the inner case 512 to receive side thrust ball bearings. A second channel 524 is also provided to receive load bearing ball bearings therein.

The swerve drive 500 works by independently rotating the entire orientation of the wheel 504. Additionally, the wheel 504 is independently powered by the hub motor 502, meaning that the entire motor assembly, gearing, wheel and mounting are all rotated precisely to provide movement in all directions to provide the functionality discussed herein.

Figure 9:
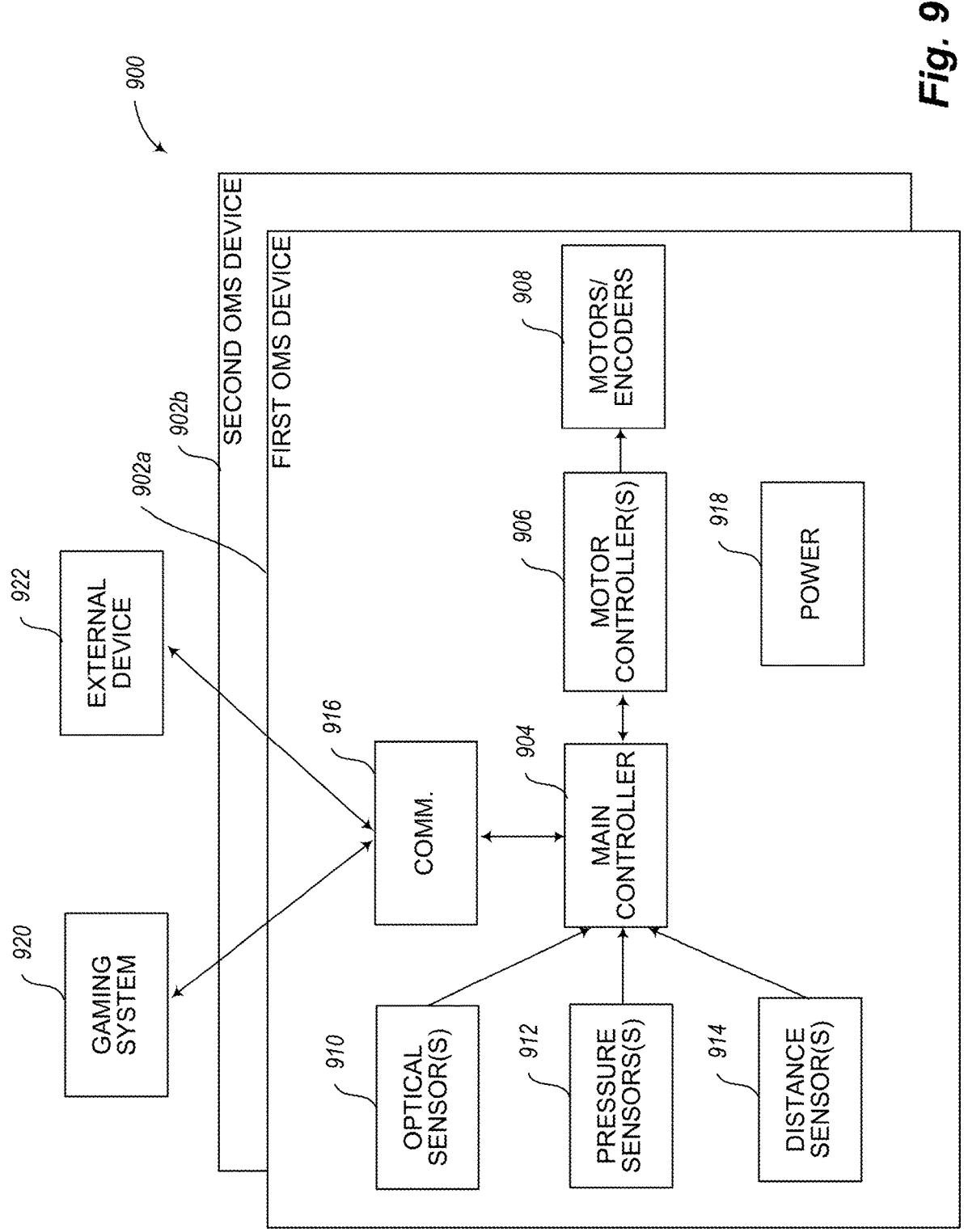
FIG. 9 is a schematic block diagram of an OMS, according to one non-limiting illustrated implementation.

FIG. 9 is a schematic block diagram of an example OMS 900. The OMS may be similar or identical to the OMSs (e.g., OMS 100, OMS 400) discussed herein. The OMS 900 includes a first OMS device 902a and a second OMS device 902b. The following discusses the various components of the first OMS device 902a, although it should be appreciated that the second OMS device 902b also includes such components and functionality.

The OMS device 902a includes a main controller 904, one or more motor controllers 906 communicatively coupled to the main controller, and four motors/encoders 908 communicatively coupled to the one or more motor controllers. The OMS device 902a also includes one or more optical sensors 910, pressure sensors 912, and distance sensors 914, as discussed above. The OMS device 902a further includes a communications interface 916 that provides wireless and/or wired communication with other devices, such as a gaming system 920, an external device 922 (e.g., smartphone, tablet computer), or the other OMS device 902b. The OMS device 902a also includes a power subsystem 918 that is operative to provide power to the various components of the OMS device. For example, the power subsystem 918 may include one or more batteries (e.g., rechargeable batteries), and charging interface/circuitry for receiving power from an external power source (e.g., AC mains).

The main controller 904 may include a processor, which may comprise one or more logic processing units, such as one or more central processing units (CPUs), microprocessors, digital signal processors (DSPs), application-specific integrated circuits (ASICs), field programmable gate arrays (FPGAs), etc. The main controller 904 may also include or be coupled to memory which stores at least one of instructions or data thereon. The memory may include one or more solid state memories, for instance flash memory, ferromagnetic non-volatile memory, or a solid state drive (SSD), which provide nonvolatile storage of computer-readable instructions, data structures, program modules and other data for the OMS. Although not depicted, the OMS device 902a may employ other nontransitory computer- or processor-readable media, for example a hard disk drive, an optical disk drive, memory card media drive, remote storage (e.g., cloud storage), etc., on which computer-readable instructions, data structures, program modules and other data for the OMS may be stored.

The communications interface 916 may include any number of inputs (e.g., buttons, dials, switches, touch sensor, touchscreen) and any number of outputs (e.g., display, LEDs, speakers, buzzers, vibration devices). To communications interface 916 may include one or more wired communications interfaces and/or one or more wireless communications interfaces. Non-limiting examples of wireless communications interfaces include Wi-Fi®, Bluetooth®, Bluetooth® Low Energy, Zigbee®, 6LoWPAN®, Optical IR, wireless HART, etc. Non-limiting examples of wired communications interfaces include USB®, CAN, UART, Ethernet, PLC, HART, MODBUS, FireWire®, Thunderbolt®, etc.

In addition to sending data to or receiving data from external devices 920 and 922 or the other OMS device 902b, in at least some implementations the OMS device 902a may receive at least one of data or instructions (e.g., control instructions) from external devices via the wired communications interface and/or the wireless communications interface.

In at least some implementations, the OMS 900 may be used in conjunction with an external processor-based device (e.g., devices 920 and 922). Such processor-based device may include various types of devices, such as gaming systems, smartphones, tablet computers, laptop computers, wearable computers, servers, cloud computers, etc. The external processor-based device may include a display to present data (e.g. status data) gathered by the OMS 900.

The motor controller 906 acts as intermediary between the main controller 904, power subsystem 918 and motors 908. The motor controller 906 is operative to provide current required to drive the motors 908. The motor controller 906 may include a single controller that controls four motors, or multiple controllers that each control less than four motors. For example, the motor controller 906 may include four separate motor controllers that each control one of the four motors, or two motor controllers that each control two of the motors.

The motor controller 906 provides position control via input from the encoders 908. The motor controller 906 may also provide current limiting functionality. The motor controller 906 may expose the control effort used to maintain position, and may limit the maximum rotations per minute (RPM) used to achieve a new position. In at least some implementations, the motor controller 906 provides trajectory planning to provide smooth start and braking operations. In at least some implementations, the motor controller 906 may provide battery power regeneration, wherein a battery of the power subsystem 918 is recharged when the motor controller 906 brakes one or more of the wheels of the OMS device 902a. As a non-limiting example, the motor controller 906 may comprise one or more customized versions of an ODrive motor controller available from ODrive Robotics, Inc.

The main controller 904 (e.g., microcontroller, PC) is responsible for sending commands to the motor controller 906 and for receiving feedback (e.g., sensor feedback, encoder feedback). The main controller 904 of each of the OMS devices 902 is operative to communicate with the main controller of the other OMS device via the communications interface 916 (e.g., Bluetooth®), which facilitates coordination of movement between the two OMS devices during operation.

In operation, the main controller 904 of each of the OMS devices 902 of the OMS 900 may execute software that is operative to coordinate and control all of the hardware components of the OMS. In particular, the main controller 904 may read state information from the motor controller 906, use the optical sensor 910 (e.g., camera) to track the user's feet, read distance data from the distance sensors 914, and read pressure data from the front and rear pressure sensors 912, as discussed above. The main controller 904 may process the received data and send commands to the motor controller 906 based at least in part on the received data to selectively position the OMS device 902a under the user's feet at all times while constraining the user's overall movement to a small area to provide stationary locomotion.

The main controller 904 may also be able to emulate a standard game controller (e.g., via Bluetooth®), which allows the OMS 900 to communicate with the gaming system 920 or external device 922 (e.g., mobile app executing on a smartphone or tablet computer). As a non-limiting example, the OMS 900 may be operative to emulate a thumbstick of a wired or wireless game controller usable with the gaming system 920 to provide full locomotion support during playing of games or for other applications. As another non-limiting example, the communications interface 916 may allow the main controller 904 to communicate status information to the gaming system 920 or the external device 922, and/or to receive updates therefrom.

Figure 10:
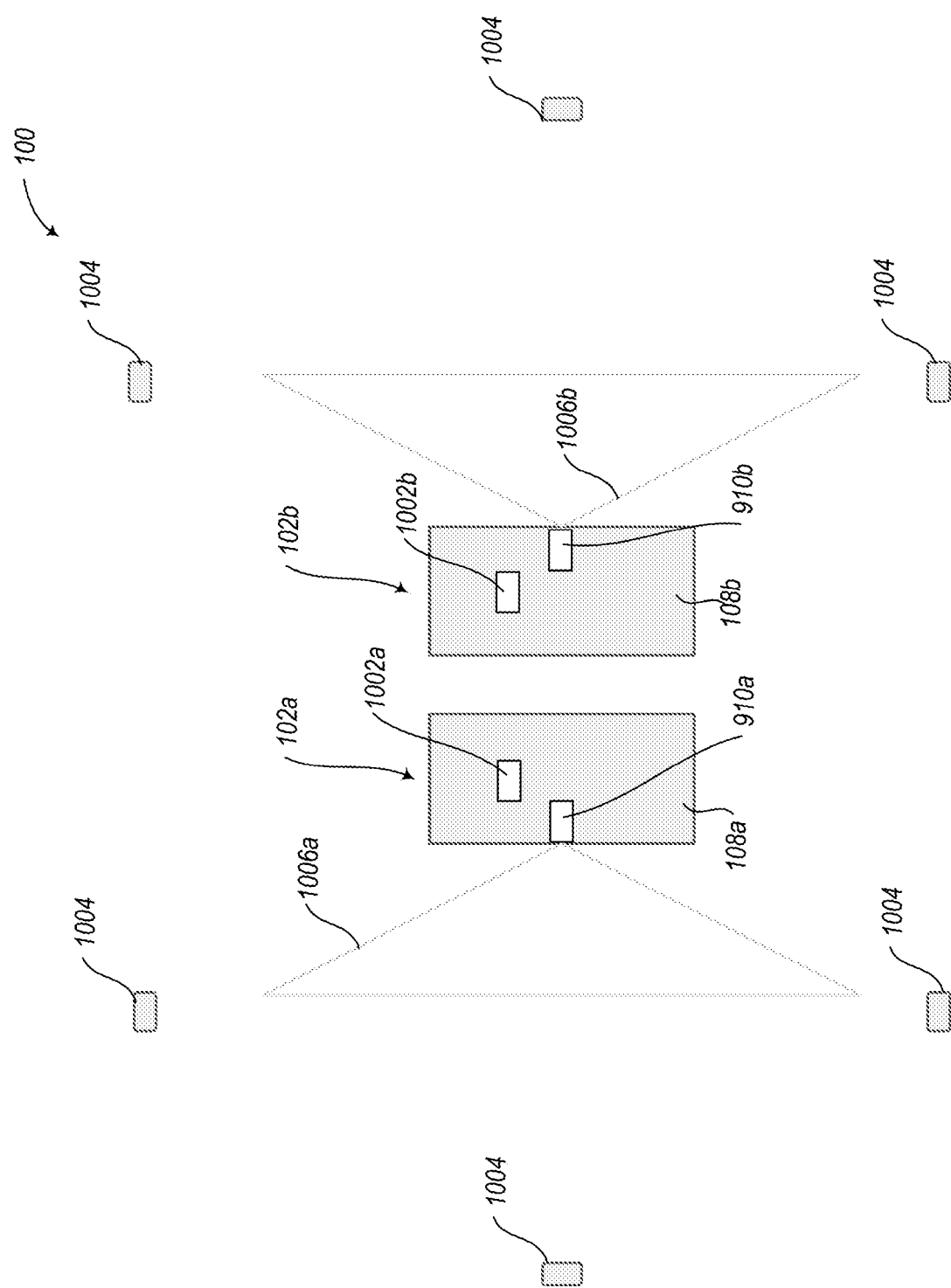
FIG. 10 is a top view of the OMS of FIG. 1 that includes cameras and inertial measurement units that allow the OMS to track its location in real-time, according to one non-limiting illustrated implementation.

FIG. 10 is a top view of the OMS 100 of FIG. 1 that includes outward directed cameras 910a and 910b and inertial measurement units (IMUs) 1002a and 1002b that allow the OMS to track its location in real-time, according to one non-limiting illustrated implementation. The cameras and IMUs may be used together to correct absolute positioning errors.

In operation, the IMUs 1002 may be used to track the position of an OMS device 102 in space for short periods of time and also to detect and correct situations when the wheels slip on the operating surface. Due to measurement errors that build up over time, an absolute positioning may be used to correct such errors. For this purpose, each OMS device 102 may include the outward facing camera 910. In at least some implementations, the camera 910 will look for fiducial markers 1004 that may be positioned before the devices are turned on. The markers (e.g., ArUco markers) may be positioned by the user to delimit the usable area. On startup, the OMS 100 may scan all of the markers 1004 around it. The number of markers used 1004 may depend on the camera angle 1006 of the camera 910. In at least some implementations, six markers are used but it should be appreciated that in other implementations fewer or more markers may be used. The OMS devices 102 may use the detected markers 1004 build an internal map of their relative positions and orientations. This feature allows the devices 102 to always know their absolute position in the operational environment. As an example, this system may be used for stand-alone mode with VR devices that do not have an absolute positioning system. For VR devices that have absolute positioning systems, this feature provides a more seamless experience to integrate with the VR system through the use of APIs/libraries.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Provisional Patent Application No. 62/627,586 filed Feb. 7, 2018, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An omnidirectional mobility system that provides stationary omnidirectional motion for a user, the omnidirectional mobility system comprising:
   first and second omnidirectional mobility system (OMS) devices, each of the OMS devices comprising:
     a body that includes a top surface that supports a foot of the user;
     a movement subsystem coupled to the body, the movement subsystem operative to cause the OMS device to move on a surface that supports the OMS device;
     a sensor subsystem coupled to the body, the sensor subsystem operative to sense at least a position of the foot of the user during use;
     at least one nontransitory processor-readable storage medium that stores at least one of instructions or data; and
     at least one processor operatively coupled to the at least one nontransitory processor-readable storage medium, the movement subsystem, and the sensor subsystem, in operation, the at least one processor:
       receives sensor data from the sensor subsystem; and
       controls the movement subsystem to position the OMS device under the foot of the user while constraining the user's overall movement to a confined area to provide substantially stationary locomotion.

2. The omnidirectional mobility system of claim 1 wherein the movement subsystem comprises:
   four wheels; and
   four motors, each of the motors operative to drive a respective one of the wheels.

3. The omnidirectional mobility system of claim 2 wherein each of the wheels comprises a Mecanum wheel.

4. The omnidirectional mobility system of claim 3 wherein each of the Mecanum wheels comprises plurality of rollers oriented at an angle of at least 60 degrees relative to a forward direction to optimize forward and backward movement relative to sideways movement of the OMS device.

5. The omnidirectional mobility system of claim 2 wherein each of the wheels comprises an omni wheel.

6. The omnidirectional mobility system of claim 2 wherein each of the motors comprises a hub motor.

7. The omnidirectional mobility system of claim 2 wherein each of the motors comprises one of a brushless motor, a slotless brushless motor, a direct current (DC) motor, or a stepper motor.

8. The omnidirectional mobility system of claim 1 wherein the movement subsystem comprises a plurality of swerve drives.

9. The omnidirectional mobility system of claim 1 wherein the movement subsystem comprises a plurality of motors and a corresponding plurality of encoders, each of the encoders being operative to determine the position of a respective one of the motors, and to provide position data to the at least one processor.

10. The omnidirectional mobility system of claim 1 wherein the sensor subsystem comprises:
an optical sensor directed upward from the top surface of the body.

11. The omnidirectional mobility system of claim 10 wherein the optical sensor comprises a camera.

12. The omnidirectional mobility system of claim 1 wherein the optical subsystem comprises an infrared (IR) camera and at least one IR light emitting diode.

13. The omnidirectional mobility system of claim 1 wherein the top surface includes a window therein, and the optical subsystem is positioned in the body below the window.

14. The omnidirectional mobility system of claim 1 wherein the sensor subsystem is operative to track both the position and the orientation of the foot of the user during use.

15. The omnidirectional mobility system of claim 1 wherein the sensor subsystem detects at least one marker coupled to the user's foot or footwear.

16. The omnidirectional mobility system of claim 1 wherein the sensor subsystem comprises:
a pressure sensor positioned proximate the top surface of the body, the pressure sensor operative to detect the weight distribution of the user supported by the top surface of the OMS device.

17. The omnidirectional mobility system of claim 16 wherein the pressure sensor comprises a first pressure sensor positioned relatively toward the front of the top surface and a second pressure sensor positioned relatively toward the rear of the top surface.

18. The omnidirectional mobility system of claim 16 wherein the pressure sensor comprises at least one of a resistive force sensing pad, a scale weighing sensor, or a strain gauge load cell.

19. The omnidirectional mobility system of claim 1 wherein the sensor subsystem is operative to track the foot of the user when the foot is in contact with the top surface and when the foot is not in contact with the top surface.

20. The omnidirectional mobility system of claim 1 wherein the sensor subsystem comprises:
a distance sensor operative to track the position of the OMS device relative to the other OMS device.

21. The omnidirectional mobility system of claim 20 wherein the distance sensor comprises at least one of an optical sensor or an acoustic sensor.

22. The omnidirectional mobility system of claim 1, further comprising:
a communications interface operatively coupled to the at least one processor, the communications interface allows the at least one processor to communicate with a separate device.

23. The omnidirectional mobility system of claim 22 wherein the communications interface allows the at least one processor to communicate with at least one of: the other OMS device, an external computing system, a gaming controller, or a peripheral device.

24. The omnidirectional mobility system of claim 22 wherein the OMS device emulates a directional input control of an input device.

25. The omnidirectional mobility system of claim 24 wherein the OMS device emulates a thumb stick of a gaming controller.

26. The omnidirectional mobility system of claim 1 wherein the body is formed from a polycarbonate material.

27. The omnidirectional mobility system of claim 1 wherein the sensor subsystem comprises:
an inertial measurement unit; and
an optical sensor,
wherein the at least one processor receives sensor input from the inertial measurement unit and the optical sensor, and tracks the location of the OMS device during movement in an operational environment.

28. The omnidirectional mobility system of claim 27 wherein the optical sensor detects a plurality of fiducial markers positioned in the operational environment.

29. The omnidirectional mobility system of claim 27 wherein the at least one processor receives the sensor input from the inertial measurement unit and the optical sensor, and generates an internal map of the operational environment based at least in part on the sensor input.

30. An omnidirectional mobility system that provides stationary omnidirectional motion for a user, the omnidirectional mobility system comprising:
first and second omnidirectional mobility system (OMS) devices, each of the OMS devices comprising:
a body that includes a top surface that supports a foot of the user;
a movement subsystem coupled to the body, the movement subsystem operative to cause the OMS device to move on a surface that supports the OMS device, the movement subsystem comprising a plurality of wheels and one or more motors coupled to drive the plurality of wheels;
a sensor subsystem coupled to the body, the sensor subsystem operative to sense a position of the foot of the user during use and to sense a position of the OMS device during operation thereof in an operational environment;
at least one nontransitory processor-readable storage medium that stores at least one of instructions or data; and
at least one processor operatively coupled to the at least one nontransitory processor-readable storage medium, the movement subsystem, and the sensor subsystem, in operation, the at least one processor:
receives sensor data from the sensor subsystem; and
controls the at least one motor of the movement subsystem to drive the plurality of wheels to position the OMS device under the foot of the user while constraining the user's overall movement to a confined area to provide substantially stationary locomotion.

31. A method of operating an omnidirectional mobility system that provides stationary omnidirectional motion for a user, the omnidirectional mobility system comprising first and second omnidirectional mobility system (OMS) devices, each of the OMS devices comprising a body that includes a top surface that supports a foot of the user, a movement subsystem coupled to the body that is operative to cause the OMS device to move on a surface that supports the OMS device, and a sensor subsystem coupled to the body that is operative to sense at least a position of the foot of the user during use, the method comprising:
receiving sensor data from the sensor subsystem of each of the OMS devices; and
responsive to the received sensor data, controlling the movement subsystem of each of the OMS devices to position each of the OMS devices under one foot of the user while constraining the user's overall movement to a confined area to provide substantially stationary locomotion.

\* \* \* \* \*